July 2, 1968  B. POLOVTSEFF  3,391,233
MANUFACTURE OF PARTICLE BOARD
Filed Jan. 16, 1967  3 Sheets-Sheet 1

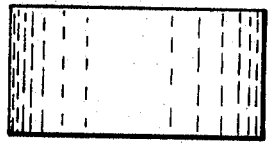
(a)
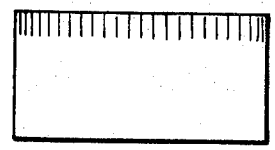
(b)
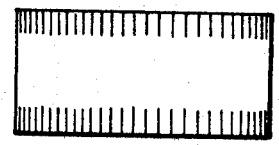
(c)
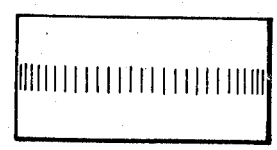
(d)
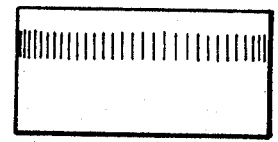
(e)
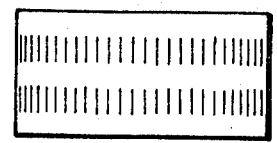
(f)
Fig.6.

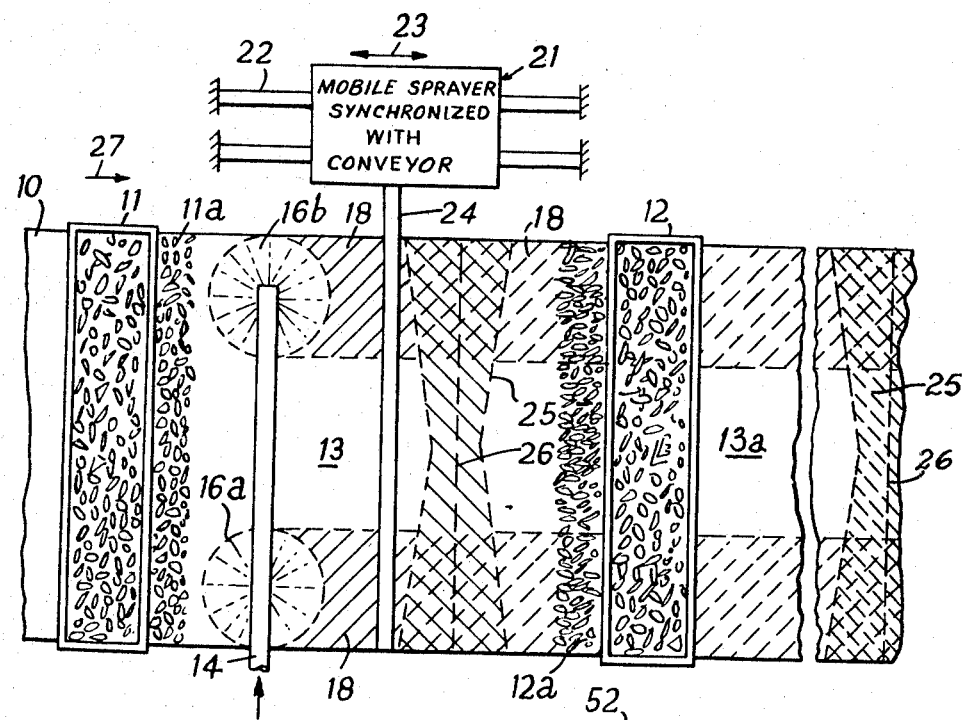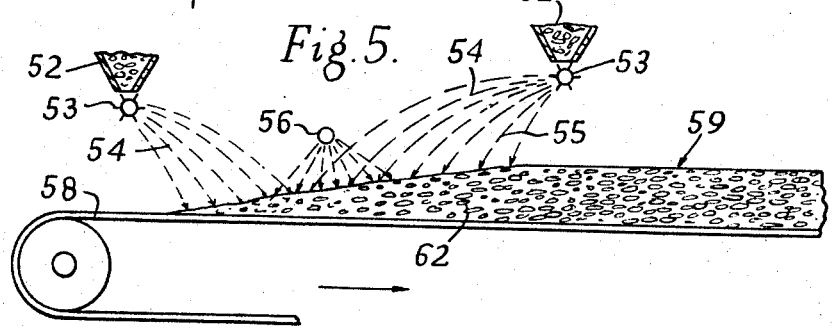

July 2, 1968　　　　　B. POLOVTSEFF　　　　3,391,233
MANUFACTURE OF PARTICLE BOARD
Filed Jan. 16, 1967　　　　　　　　　　　　3 Sheets-Sheet 3
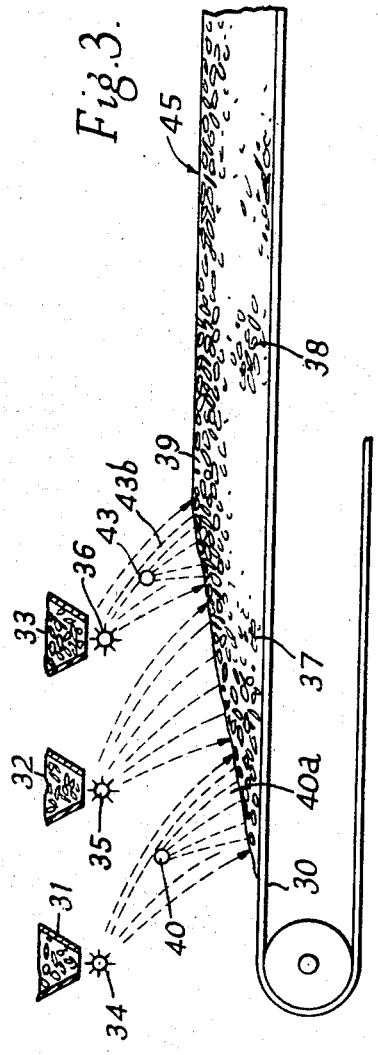
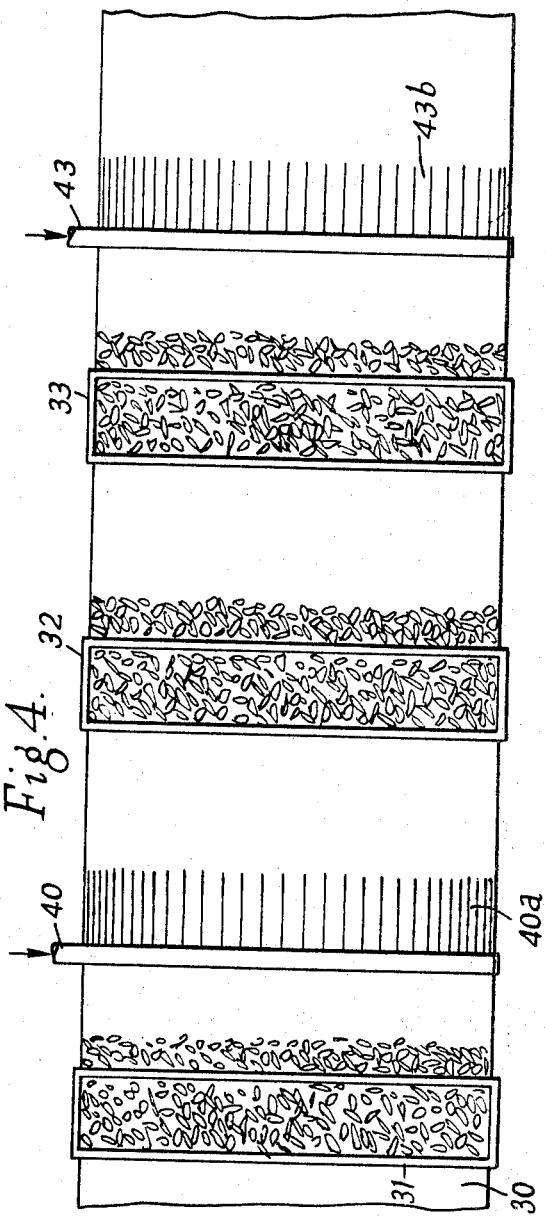

United States Patent Office 3,391,233
Patented July 2, 1968

3,391,233
MANUFACTURE OF PARTICLE BOARD
Boris Polovtseff, 165 Almners Road,
Lyne, Chertsey, England
Continuation-in-part of application Ser. No. 312,860,
Oct. 1, 1963. This application Jan. 16, 1967, Ser.
No. 609,366
13 Claims. (Cl. 264—113)

ABSTRACT OF THE DISCLOSURE

A method of manufacturing boards from wood chips or from other particulate materials, hereinafter referred to as particle board, which includes mixing the chips with a thermo-setting binder spreading the mix layer upon layer on a travelling conveyor surface to form a mattress, and consolidating the mattress by compressing it in a press having heated platens. During the formation of the mattress, liquid is sprayed onto the chips forming the marginal portions or onto the chips forming one or more layers with increased wetting towards the edges of the layers, so that the rate of shrinkage is substantially constant throughout the cured board during and after the hot pressing.

CROSS-REFERENCES TO RELATED APPLICATIONS

This application is a continuation-in-part of my application Ser. No. 312,860, filed Oct. 1, 1963, now abandoned, entitled "Manufacture of Particle Board."

BACKGROUND OF THE INVENTION

This invention relates to the manufacture of particle board by consolidation under heat and pressure of a mattress of chips and thermo-setting binder.

Previously, particle board manufactured by compression of a mattress of chips and binder in a press having heated platens was of uneven thickness, even though great care was taken to ensure that the mattress was of even thickness throughout and the press platens exactly parallel. The centre portions of such boards were usually thinner than the marginals portions. If boards of even thickness were required, it was necessary to sand off the outer marginal areas. The variation in thickness is generally quite small, but in mass production the wastage of material in sanding off the marginal surfaces is substantial. Previous attempts to overcome this problem by inserting a concave filler block between the mattress and a platen of the press have not been completely successful.

SUMMARY OF THE INVENTION

According to the present invention there is provided a method of manufacturing particle board which includes mixing particulate material with a thermo-setting binder, spreading the mixed particles layer upon layer on a travelling conveyor surface that is moving in a longitudinal direction to form a mattress, and consolidating the mattress under heat and pressure to form a board, wherein the marginal areas of the mattress are provided with a higher moisture content than the centre portion, so that the rate of consequent shrinkage is substantially constant throughout the cured board during and after hot pressing.

The present invention arose from the belief by the Applicant that the variation in thickness of particle boards obtained from mattresses of constant moisture content throughout, arose from shrinkage of the centre portion and swelling of the marginal portions after the board was cured in the press, the shrinkage commencing even before the press was opened and the swelling commencing immediately the press was opened. During the consolidation of the mattress in a hot press the marginal areas surrounding an approximately elliptical central area are dried out first and most fully, and this causes an unequal distribution of moisture within the plane of the board, leaving the central area with a higher moisture content than the marginal areas. After the board is cured however, the wet central portion shrinks due to drying while in the hot press, immediately after the press has been opened, and after the board has left the press. The peripheral drier portions of the board swell due to moisture absorption from the air and due to moisture migration from the central portion of the board.

The method of the invention compensates for the unequal loss of moisture of the cured board in the press and after leaving the press, by initially wetting the marginal areas of the mattress prior to consolidation of the mattress in the press so that the cured board leaves the press with a substantially constant moisture content throughout. A board manufactured according to the invention will of course, in common with all wooden articles, absorb moisture from and loose moisture to the surrounding atmosphere according to the relative humidity of the surrounding air, but any shrinkage or swelling due to this will occur equally throughout the board.

Ideally, the whole marginal area surrounding an approximately elliptical central area of the mattress is moistened prior to the consolidation of the mattress by heat and pressure, with the moisture content gradually increasing from a minimum adjacent the central area to a maximum at the outer edges of the mattress. Satisfactory results can however be obtained by moistening marginal bands along the sides and ends of a mattress, or even moistening only the marginal bands along the sides in a mattress in which the ratio of length to width is high.

In the method of the invention, liquid may be sprayed onto the chips which have just been deposited, or which are in course of being spread onto the conveyor to form marginal areas of a mattress, while the mattress is being formed.

One of the common practices in chip spreading is permitting the same to fall from hoppers onto spinning spiked horizontal rollers. The rollers, in spinning, fling the chips so that in falling they are deposited continuously layer upon layer to cover a predetermined area on a conveyor and build up the required mattress. It is as the chips are being thus deposited that water, a solution of binder or other liquid is sprayed over them for the purpose of carrying out the present invention.

By introduction of a binder solution into the sprays, an additional effect of extra strong bond is achieved in the marginal areas which is beneficial in preventing the crumbling of the mattress edges during its handling by the conveyor and by the loader and during the pressing operation prior to contact with the top platen of the press, and which results in a stronger board edge after pressing.

In addition to moistening the marginal areas of the mattress, one or more layers of the mattress may be provided with a higher moisture content than adjacent layers in order to obtain different physical properties in the finished board. Conveniently, one or more selected layers may be provided with a higher moisture content than an adjacent layer, with the marginal areas of the selected layer having a higher moisture content than the centre thereof and thereby ensuring a substantially uniform rate of shrinkage of the board during and after hot pressing.

Increasing the moisture content of different layers provides different physical properties for the boards due to the fact that, after consolidation of the mattress by heat and pressure, the layer or layers having the increased moisture content are harder and denser than would be the case if such layers were not intentionally moistened.

Water or other liquid may be sprayed onto the particles intended to form one or some of the middle layers of the board as such particles are falling or have fallen onto the moving conveyor. By this means a board having increased flexibility is produced. If the liquid is sprayed on the particles forming face layers of the mattress and the marginal areas are made wetter than the rest of the mattress, then the resulting board has a higher modulus of elasticity and essentially an even thickness shrinkage.

BRIEF DESCRIPTION OF THE DRAWING

FIGURE 2 is a somewhat diagrammatic plan view of apparatus for longitudinal and transverse spraying of a mattress as it is being formed, a portion of the apparatus and mattress thereon being broken away.

FIGURE 3 is a somewhat diagrammatic side elevational view of apparatus for spraying selected layers of a mattress as it is being formed.

FIGURE 4 is a plan view of the structure shown in FIGURE 3, and

FIGURE 5 is a diagrammatic side elevational view of apparatus for spraying the middle layer of the mattress as the mattress is being formed.

FIGURE 6 illustrates different patterns of moisture in mattresses formed in the method according to the invention.

DESCRIPTION OF THE PREFERRED EMBODIMENTS

Figure 1:
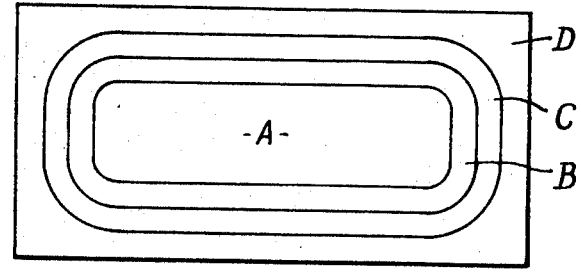
FIGURE 1 is a diagram of the typical variation in thickness found in particle board manufactured according to previous known methods.

The view in FIGURE 1 is a plan of a particle board manufactured according to the previously practiced method in which the moisture in the mattress is distributed evenly throughout prior to consolidation in the hot press. Marked on the plan view are areas of different thickness, namely a central area A and concentric bands B, C, D, which are approximately elliptical in shape and surround the central area A. In a typical example of such a board the central area A may have an average thickness of 0.790 to 0.795 inch and bands B, C, D, may have average thicknesses of 0.800, 0.805, 0.810 inch respectively, the thickness gradually changing from each area to the adjacent areas.

The apparatus shown in FIGURE 2 enables mattresses to be formed with a moisture content which is greater in the marginal areas corresponding approximately to bands B, C and D than in the central area A.

In FIGURE 2, there is illustrated a travelling conveyor 10 with a pair of spaced hoppers 11, 12 suspended thereabove for depositing on the conveyor separate layers of chips mixed with a thermo-setting binder, for example, a synthetic resin. The chips from hopper 11 are scattered by spiked rollers in the direction of travel of the conveyor as shown at 11a, and the chips from hopper 12 are scattered in the opposite direction as shown at 12a. A stationary pipe 14 extending transversely across conveyor is provided with a jet overhanging each longitudinal edge portion of the conveyor to spray a liquid onto the chips deposited and being deposited from the hopper 11, the spray pattern for each jet being designated by 16a, 16b respectively. As a result, the longitudinal edge portions 18 of the first layer 13 have a liquid sprayed thereon. A longitudinally reciprocating sprayer generally designated 21 is mounted for movement on means 22 in the direction of double arrow 23, the movement of sprayer 21 in direction of arrow 27 being in synchronism with the movement of the conveyor surface that moves in the direction of arrow 27. The sprayer 21 includes a transversely extending pipe 24 having a series of jets to spray the liquid onto the layer 13 in a sprayed pattern 25 that extends transversely across the layer 13 and is flared outwards from the centre line of the layer towards the side edges thereof. The second hopper 12 and its accompanying spiked roller deposit a second layer 13a of chips over the aforementioned layer 13 to form the complete mattress.

In operation, the sprayer 21 travels forwards from left to right in FIGURE 2 at the same speed as the conveyor with the pipe 24 positioned directly over the transverse dotted line 26 along which the material on the conveyor is subsequently divided to form separate mattresses to be consolidated by heat and pressure in a press. During this movement from left to right the sprayer 21 sprays liquid on to the layer 13 in the spray pattern 25 shown in FIGURE 2. When the sprayer 21 has reached its forward limit of travel, the sprayer is moved quickly rearwards to the junction with the next succeeding mattress and again travels forwards in synchronism with the conveyor to spray liquid in the pattern 25 along the dividing line 26. The means 22 for reciprocating the sprayer 21 is driven from the conveyor and can be of any suitable construction. Since the spray pattern 25 is flared outwards from the center line of the conveyor towards the side edges thereof, liquid is sprayed across the transverse edges of the mattresses and also across the corners of the mattresses. Through the use of sprayer 21 and spray jets at pipe 14, the liquid is thus sprayed on to the longitudinal, transverse, and corner marginal areas of the mattress surrounding an approximately elliptical center portion corresponding to the area A shown in FIGURE 1.

Although FIGURE 2 shows a mobile sprayer 21, it is to be understood that if it is not desired to spray liquid on transverse edge portions, the sprayer 21 may be omitted, or with provision appropriate of a valve (not shown) in pipe 24 the spray from pipe 24 may be discontinued.

Referring to FIGURES 3 and 4, there is illustrated a continuous travelling conveyor 30 wherein chips mixed with a thermo-setting binder are spread onto the conveyor by permitting the chips to fall from the hoppers 31, 32 and 33 respectively onto the spinning spiked horizontal rollers 34, 35 and 36 to respectively provide a face layer 37, a middle layer 38, and a second face layer 39, of a mattress generally designated 45. A transverse stationary pipe 40 and a second stationary transverse pipe 43, each having a plurality of jets, is extended across the conveyor to spray a liquid onto the layers 37 and 39 respectively and chips forming said layers as they are falling to increase the moisture content of said layers 37, 39 as the mattress is being built up on the conveyor. The jets of pipes 40, 43 are positioned and adjusted so as to provide spray patterns 40a, 43b, in which the intensity of spraying increases from the centre area to the outer edges of the mattress being formed.

Referring to FIGURE 5 spaced hoppers 52, 52 permit chips mixed with binder to fall therefrom onto the spinning spiked rollers 53, 53 respectively which scatter the chips as shown at 54 and 55 to build up a mattress 59 on the conveyor 58. A transversely extending stationary pipe 56 (of a construction indicated for pipe 40) sprays a liquid onto the chips which have been deposited on the conveyor and also those which are in the course of being spread on the conveyor to form the mattress, the intensity of spraying increasing from the centre area of the mattress to the outer edges thereof. As may be noted in FIGURE 5 the spray pattern of the liquid is such that it is sprayed on the particles forming the middle layer or layers 62 of the mattress.

The liquid sprayed onto the mattress in accordance with any of the embodiments described above may be water, a solution of a binder, or other liquids. Water may be sprayed on to the central area of the mattress and a binder solution sprayed on to the two longitudinal marginal areas to provide an extra strong bond which prevents crumbling of the mattress edges during handling.

It is of course to be understood that the quantity of liquid added to the marginal areas of the mattress is such that, after consolidation of the mattress and setting of the binder in a press having heated platens, the marginal areas of the board have substantially the same moisture content as the central portion of the board and consequently equal rates of shrinkage when drying out during and after hot pressing. The quantity of liquid to be added will depend on numerous factors such as the moisture content of the chips, the quantity and moisture content of the binder, and on the design and operation of the press, and can be determined by one skilled in the art.

FIGURE 6 shows cross sections of mattresses having different patterns of moisture content which result in particle boards of different physical characteristics, the parts of the mattress having increased moisture content being shown by shading lines. It will of course, be appreciated that the depth of the mattresses are shown enlarged relative to their width in order to illustrate more clearly the moisture patterns.

FIGURE 6(a) shows a cross section of a mattress in which the marginal areas through their entire depth are provided with a higher moisture content than the centre area of the mattress, the moisture content increasing from a minimum adjacent the centre area to a maximum at the outer edges. This mattress after consolidation by heat and pressure, provides a board of substantially even thickness and constant density throughout.

FIGURES 6(b)(c)(d)(e)(f) show mattresses in which one or more layers are provided with a higher moisture content than the remainder of the mattress, the moisture content in each of such layers increasing from the centre towards the outer edges. After consolidation by heat and pressure, each board will have a substantially even thickness due to the excess moisture in the marginal areas, and the moistened layers in the resulting boards will be harder and denser than would be the case if such layers were not moistened.

FIGURE 6(b) shows a mattress in which only the top layer of the mattress is moistened. The resulting board has a top layer which is harder and denser than the remainder of the board and will thus bend along this top layer when subjected to load.

FIGURE 6(c) shows a mattress in which the top and bottom layers are moistened. This results in a board having maximum stiffness.

FIGURE 6(d) shows a mattress in which the middle layer is moistened, resulting in a board having maximum symmetrical flexibility.

FIGURE 6(e) shows a mattress in which the moistened layer is an intermediate layer between the middle layer and a surface layer, resulting in a board having asymmetrical stiffness and medium flexibility.

FIGURE 6(f) shows a mattress in which the moistened layers are intermediate layers symmetrical about the middle layer of the mattress. This results in a board of medium flexibility of symmetrical stiffness.

Although I have shown and described specific constructions of apparatus for carrying out the method of my invention, this has only been made by way of example. My invention, therefore, is not to be restricted except insofar as is necessitated by the prior art and by the spirit of the appended claims.

I claim:

1. A method of manufacturing particle board which includes mixing particulate material with a thermo-setting binder, spreading the mixed particles layer upon layer on a traveling conveyor surface that is moving in a longitudinal direction to form a mattress, and consolidating the mattress under heat and pressure to form a board characterized in that liquid is sprayed on to the mixed particles forming the marginal areas of at least one layer of the mattress, the spray pattern of the liquid being such that the moisture content of said marginal areas after spraying increases from a minimum near the inner zone to a maximum at the outer zone of said marginal areas, whereby the rate of shrinkage is substantially constant throughout the board during and after hot pressing.

2. The method of claim 1, characterized in that said liquid comprises a solution of an adhesive binder.

3. The method of claim 1 further characterized in that the liquid and particles respectively comprise water and wood chips.

4. A method of manufacturing particle board which includes mixing particulate material with a thermo-setting binder, spreading the mixed particles layer upon layer on a traveling conveyor surface that is moving in a longitudinal direction to form a mattress, and consolidating the mattress under heat and pressure to form a board, characterized in that liquid is sprayed onto the longitudinal, transverse and corner marginal areas of the mattress surrounding an approximately elliptical center portion of the mattress so that said marginal areas of the mattress have a higher moisture content than the center portion thereof and the rate of shrinkage is substantially constant throughout the board during and after hot pressing.

5. A method of manufacturing particle board which includes mixing particulate materials with a thermo-setting binder, spreading the mixed particles layer upon layer on a travelling conveyor surface to form a mattress, and consolidating the mattress under heat and pressure to form a board, characterised in that at least one selected layer of the mattress is provided with a higher moisture content than adjacent layers, with the marginal areas of the selected layer having a higher moisture content than the centre thereof, so that the density of the selected layer is increased and the rate of shrinkage is substantially constant throughout the board during and after hot pressing.

6. The method of claim 5, further characterised in that said selected layer is one of the face layers of the mattress, whereby the board obtained by consolidation of the mattress under heat and pressure has a substantially even thickness and a face layer which is appreciably harder and denser than the remainder of the board.

7. The method of claim 5, further characterised in that the selected layers are the two face layers of the mattress, whereby the board obtained by consolidation of the mattress under heat and pressure has a substantially even thickness and two face layers which are appreciably harder and denser than the remainder of the board.

8. The method of claim 5, further characterised in that said selected layer is the middle layer of the mattress.

9. The method of claim 5, further characterised in that said selected layer is an intermediate layer between the middle and a face layer of the mattress.

10. The method of claim 5, further characterised in that the said selected layers are two intermediate layers symmetrical about the middle layer.

11. The method of claim 5, further characterised in that the selected layer is provided with the increased moisture content by spraying liquid onto the particles as they are being spread onto the conveyor to form the selected layer.

12. The method of claim 11, characterised in that said liquid is sprayed in such a manner that the moisture content of the marginal areas of the selected layer of the mattress increases from a minimum at the inner zone to a maximum at the outer zone adjacent the edge of the mattress.

13. The method of claim 12, further characterised in that the moisture content in at least one area of the selected layer is increased by spraying a solution of an adhesive binder onto the particles being sprayed onto the conveyor to form such an area, and further characterised in that the moisture content in at least one other area of the selected layer is increased by spraying water onto the related particles.

References Cited

UNITED STATES PATENTS

| | | | |
|---|---|---|---|
| 2,453,679 | 11/1948 | Stamm et al. | 161—262 |
| 2,583,618 | 1/1952 | Weyerhaeuser | 264—122 |
| 2,673,370 | 3/1954 | Goss | 264—113 |

EARL M. BERGERT, *Primary Examiner.*

W. E. HOAG, *Assistant Examiner.*